United States Patent
Christian et al.

(10) Patent No.: US 9,110,994 B2
(45) Date of Patent: Aug. 18, 2015

(54) PERTURBATION OF A SHARED, DISTRIBUTED CUBE

(71) Applicant: SAS Institute Inc., Cary, NC (US)

(72) Inventors: Stacey M. Christian, Cary, NC (US); Donald James Erdman, Raleigh, NC (US); Scott T. Gray, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 202 days.

(21) Appl. No.: 13/950,016

(22) Filed: Jul. 24, 2013

(65) Prior Publication Data

US 2014/0280330 A1  Sep. 18, 2014

Related U.S. Application Data

(60) Provisional application No. 61/777,589, filed on Mar. 12, 2013.

(51) Int. Cl.
 *G06F 17/30* (2006.01)

(52) U.S. Cl.
 CPC .................... *G06F 17/30864* (2013.01)

(58) Field of Classification Search
 CPC .............................................. G06F 17/30864
 USPC ........... 707/713, 724, 770, 707, 718, 737, 754
 See application file for complete search history.

(56) References Cited

U.S. PATENT DOCUMENTS

| | | | |
|---|---|---|---|
| 7,139,730 B1 | 11/2006 | Shimko et al. | |
| 7,904,383 B2 | 3/2011 | Livermore et al. | |
| 8,326,722 B2 | 12/2012 | Navin | |
| 8,533,218 B2 * | 9/2013 | Debrot et al. | 707/602 |
| 8,606,813 B1 * | 12/2013 | Bedell et al. | 707/770 |
| 8,660,985 B2 * | 2/2014 | Wang et al. | 707/602 |
| 2012/0303546 A1 | 11/2012 | Zhu et al. | |

OTHER PUBLICATIONS

K. Virolainen, Macro stress testing with a macroeconomic credit risk model for Finland, Bank of Finland Discussion Papers, vol. 18, 2004.
T. Hughes, Portfolio Stress Testing, Moody's Analytics, Sep. 2007.
B. Dvorak, Credit Portfolio Stress Testing: Beyond the Buzz Words, Moody's KMV Company, 2008.
Board of Governors of the Federal Reserve System, The Supervisory Capital Assessment Program: Design and Implementation, Apr. 24, 2009.

(Continued)

*Primary Examiner* — Marc Filipczyk
(74) *Attorney, Agent, or Firm* — Bell & Manning, LLC

(57) ABSTRACT

A method of performing a query on a cube of data is provided. A cube of data is distributed onto a plurality of computing devices with each computing device of the plurality of computing devices storing a different portion of the cube of data. A perturbation rule configured for application to the cube of data and associated with a user is received. A process space associated with the user is created. The received perturbation rule is compiled in association with the created process space. A query on the portion of the cube of data stored at the computing device is received. The received query is associated with the created process space. The query is processed while applying the compiled perturbation rule to data extracted from the portion of the cube of data stored at the computing device. A result of the processed query is sent to a requesting computing device.

24 Claims, 7 Drawing Sheets

(56) References Cited

OTHER PUBLICATIONS

Bangia et al., Ratings Migration and the Business Cycle, With Application to Credit Portfolio Stress Testing, Apr. 11, 2000.

Loan Portfolio Stress Test, Credit Risk Management, L.L.C., Downloaded from http://www.creditriskmgt.com/portfolio-stress-test.html on Apr. 27, 2013.

FICO Portfolio Stress Testing, 2009.

Portfolio Stress Testing Made Easy, Portfolio Science, Downloaded from http://www.portfolioscience.com/portfolio-stress-testing on Apr. 27, 2013.

J. Berkowitz, A Coherent Framework for Stress-Testing, Jul. 14, 1999.

M. Sorge, Stress-testing financial systems: an overview of current methodologies, BIS Working Papers, No. 165, Dec. 2004.

Portfolio Stress Testing, Interthinx Predictive Analytics, Downloaded from http://www.strategicanalytics.com/svc_stresstesting.php on Apr. 27, 2013.

Stress Testing Portfolio Risk—FactSet Research Systems, Downloaded from http://www.factset.com/products/im/stresstesting on Apr. 27, 2013.

\* cited by examiner

PERTURBATION OF A SHARED, DISTRIBUTED CUBE

CROSS-REFERENCE TO RELATED APPLICATIONS

The present application claims priority under 35 U.S.C. §119(e) to U.S. Provisional Patent Application No. 61/777,589 filed Mar. 12, 2013, the entire contents of which are hereby incorporated by reference.

BACKGROUND

An extremely large cube of data may be distributed across a multi-node grid of connected computing devices to reduce access times and to scale the storage space. Multiple users may access the cube of data at any given time. It may be impractical to store multiple copies of the cube of data due to the extremely large amount of disk space needed as well as the memory needed to load the cube of data for use by users. Memory mapping technology may be used so that, as multiple users access the same cube, the cube is loaded into memory only once.

SUMMARY

In an example embodiment, a method of performing a query on a cube of data is provided. A cube of data is distributed onto a plurality of computing devices with each computing device of the plurality of computing devices storing a different portion of the cube of data. A perturbation rule configured for application to the cube of data and associated with a user is received. A process space associated with the user is created. The received perturbation rule is compiled in association with the created process space. A query on the portion of the cube of data stored at the computing device is received. The received query is associated with the created process space. The query is processed while applying the compiled perturbation rule to data extracted from the portion of the cube of data stored at the computing device. A result of the processed query is sent to a requesting computing device.

In another example embodiment, a computer-readable medium is provided having stored thereon computer-readable instructions that when executed by a computing device, cause the computing device to perform the method of performing a query on a cube of data.

In yet another example embodiment, a system is provided. The system includes, but is not limited to, a processor and a computer-readable medium operably coupled to the processor. The computer-readable medium has instructions stored thereon that, when executed by the processor, cause the system to perform the method of performing a query on a cube of data.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
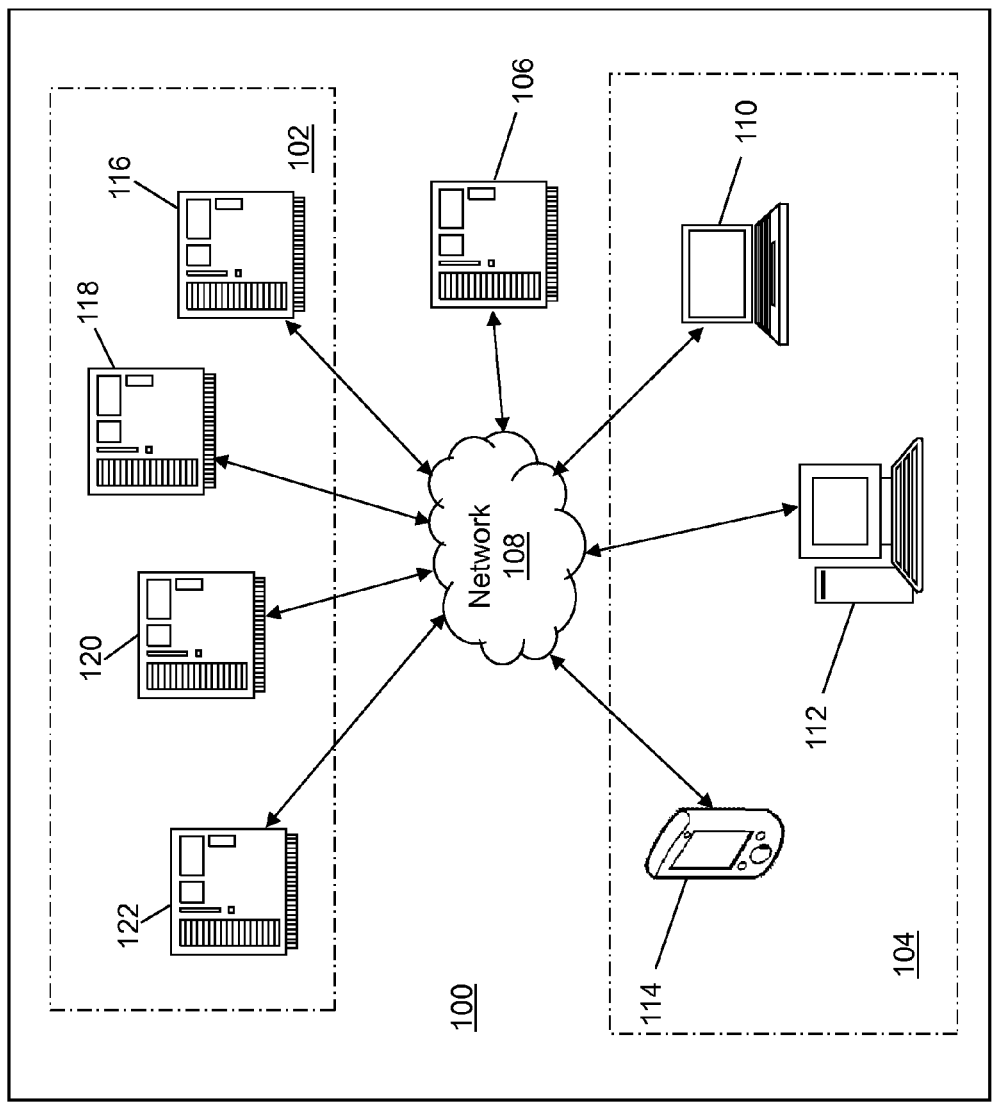
FIG. 1 depicts a block diagram of a query processing system in accordance with an illustrative embodiment.

Referring to FIG. 1, a block diagram of a query processing system 100 is shown in accordance with an illustrative embodiment. In an illustrative embodiment, query processing system 100 may include grid systems 102, data access systems 104, a grid control device 106, and a network 108. Grid systems 102 store a cube of data. Data access systems 104 access data stored in the cube of data distributed to grid systems 102. The grid control device 106 coordinates and controls access by data access systems 104 to the data stored by grid systems 102.

The components of query processing system 100 may be located in a single room or adjacent rooms, in a single facility, and/or may be distributed geographically from one another. Each of the grid systems 102, the data access systems 104, and grid control device 106 may be composed of one or more discrete devices.

Network 108 may include one or more networks of the same or different types. Network 108 can be any type of wired and/or wireless public or private network including a cellular network, a local area network, a wide area network such as the Internet, etc. Network 108 further may comprise sub-networks and consist of any number of devices.

For illustration, FIG. 1 represents the grid systems 102 with a first server computer 116, a second server computer 118, a third server computer 120, and a fourth server computer 122. Grid systems 102 can include any number and type of computing devices that may be organized into subnets. The computing devices of the grid systems 102 send and receive signals through network 108 to/from another of the one or more computing devices of the grid systems 102, to/from grid control device 106, and/or to/from the data access systems 104. The one or more computing devices of the grid systems 102 may include computers of any form factor. The one or more computing devices of the grid systems 102 may communicate using various transmission media that may be wired and/or wireless as understood by those skilled in the art.

The data access systems 104 can include any number and type of computing devices that may be organized into subnets. The computing devices of the data access systems 104 send and receive signals through network 108 to/from another of the one or more computing devices of the data access systems 104, to/from the grid systems 102, and/or to/from grid control device 106. The one or more computing devices of the data access systems 104 may include computers of any form factor such as a laptop 110, a desktop 112, a smart phone 114, a personal digital assistant, an integrated messaging device, a tablet computer, etc. The one or more computing devices of the data access systems 104 may communicate using various transmission media that may be wired and/or wireless as understood by those skilled in the art.

In the illustrative embodiment, grid control device 106 is represented as a server computing device though grid control device 106 may include one or more computing devices of any form factor that may be organized into subnets. Grid control device 106 sends and receives signals through network 108 to/from the grid systems 102 and/or to/from the data access systems 104. Grid control device 106 may communicate using various transmission media that may be wired and/or wireless as understood by those skilled in the art.

Figure 2:
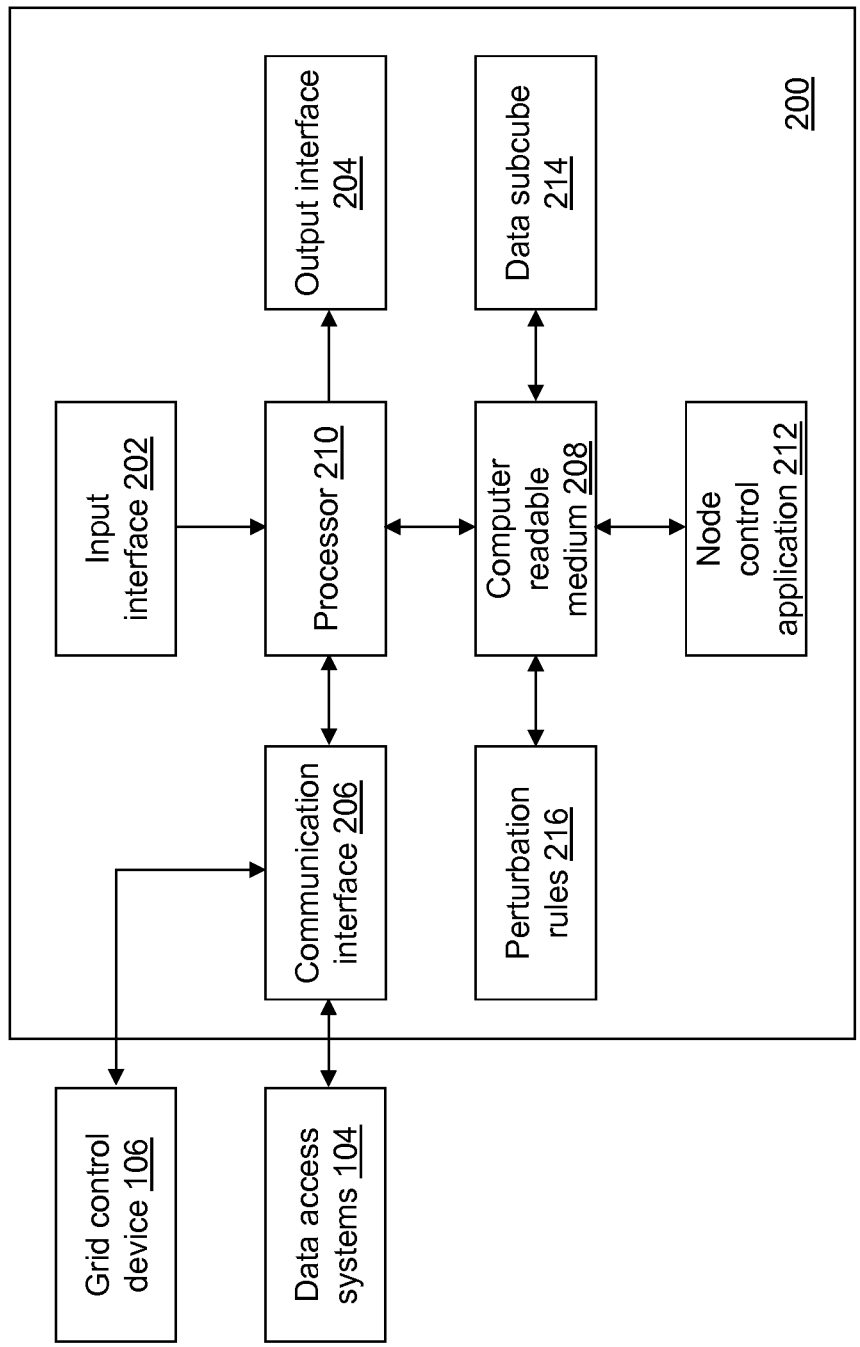
FIG. 2 depicts a block diagram of a node device of the query processing system of FIG. 1 in accordance with an illustrative embodiment.

Referring to FIG. 2, a block diagram of a node device 200 of the grid systems 102 is shown in accordance with an illustrative embodiment. Node device 200 is an example computing device of the grid systems 102. Node device 200 may include an input interface 202, an output interface 204, a communication interface 206, a computer-readable medium 208, a processor 210, a node control application 212, a data subcube 214, and perturbation rules 216. Fewer, different, and additional components may be incorporated into node device 200.

Input interface 202 provides an interface for receiving information from the user for entry into node device 200 as understood by those skilled in the art. Input interface 202 may interface with various input technologies including, but not limited to, a keyboard, a mouse, a display, a track ball, a keypad, one or more buttons, etc. to allow the user to enter information into node device 200 or to make selections presented in a user interface displayed on the display. The same interface may support both input interface 202 and output interface 204. For example, a display comprising a touch screen both allows user input and presents output to the user. Node device 200 may have one or more input interfaces that use the same or a different input interface technology. The input interface technology further may be accessible by node device 200 through communication interface 206.

Output interface 204 provides an interface for outputting information for review by a user of node device 200. For example, output interface 204 may interface with various output technologies including, but not limited to, the display, a speaker, a printer, etc. Node device 200 may have one or more output interfaces that use the same or a different output interface technology. The output interface technology further may be accessible by node device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Node device 200 may have one or more communication interfaces that use the same or a different communication interface technology. Data and messages may be transferred between node device 200 and the data access systems 104 and/or grid control device 106 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, cache memory such as level 1 and/or level 2 cache memory, etc. Node device 200 may have one or more computer-readable media that use the same or a different memory media technology. Node device 200 also may have one or more drives that support the loading of a memory media such as a CD, DVD, an external hard drive, etc. One or more external hard drives further may be connected to node device 200 using communication interface 206.

Processor 210 executes instructions as understood by those skilled in the art. The instructions may be carried out by a special purpose computer, logic circuits, or hardware circuits. Processor 210 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 210 executes an instruction, meaning it performs/controls the operations called for by that instruction. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Node device 200 may include a plurality of processors that use the same or a different processing technology.

Node control application 212 performs operations associated with controlling access to the data stored in data subcube 214. Some or all of the operations described herein may be embodied in node control application 212. The operations may be implemented using hardware, firmware, software, or any combination of these methods. Referring to the example embodiment of FIG. 2, node control application 212 is implemented in software (comprised of computer-readable and/or computer-executable instructions) stored in computer-readable medium 208 and accessible by processor 210 for execution of the instructions that embody the operations of node control application 212. Node control application 212 may be written using one or more programming languages, assembly languages, scripting languages, etc.

Node control application 212 may be implemented as a Web application. For example, node control application 212 may be configured to receive hypertext transport protocol (HTTP) responses from other computing devices such as those associated with grid control device 106 and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an extensible markup language (XML) file, or any other type of file supported by HTTP.

Data subcube 214 stores a portion of a cube of data distributed across the grid systems 102 with each computing device of the grid systems 102 storing a different portion of the cube of data. Grid control device 106 further may store a portion of the cube of data.

Perturbation rules 216 perform operations applied to data read from data subcube 214 before the data is returned as part of a query of data subcube 214. The operations may be implemented using hardware, firmware, software, or any combination of these methods. Referring to the example embodiment of FIG. 2, perturbation rules 216 are implemented in software (comprised of computer-readable and/or computer-executable instructions) stored in computer-readable medium 208 and accessible by processor 210 for execution of the instructions that embody the operations of perturbation rules 216. In an illustrative embodiment, perturbation rules 216 are compiled before application to the data read from data subcube 214. Perturbation rules 216 may be written using one or more programming languages, assembly languages, scripting languages, etc.

Figure 3:
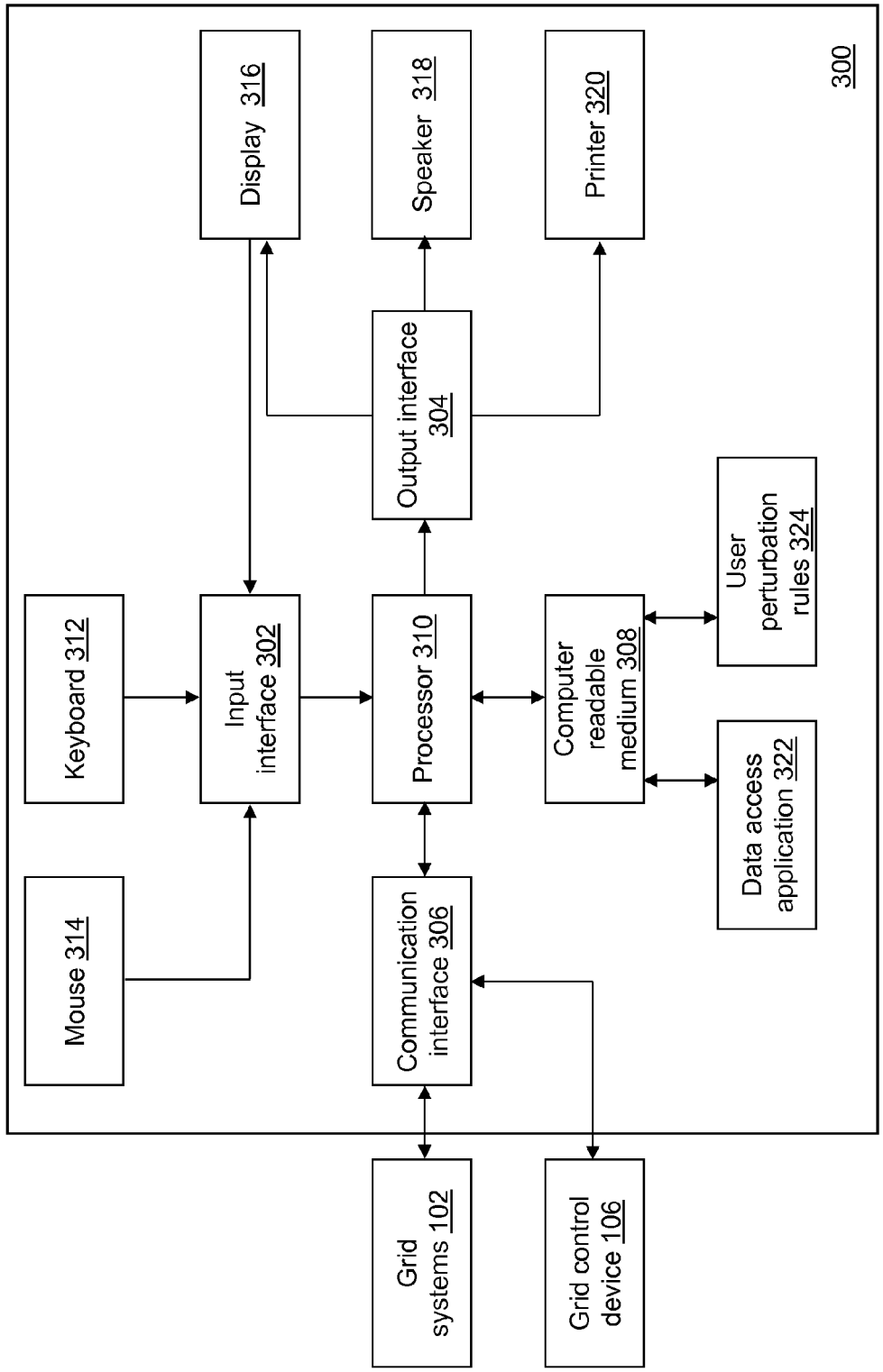
FIG. 3 depicts a block diagram of a data access device of the query processing system of FIG. 1 in accordance with an illustrative embodiment.

Referring to FIG. 3, a block diagram of a data access device 300 of the data access systems 104 is shown in accordance with an example embodiment. Data access device 300 is an example computing device of the data access systems 104. Data access device 300 may include a second input interface 302, a second output interface 304, a second communication interface 306, a second computer-readable medium 308, a second processor 310, a keyboard 312, a mouse 314, a display 316, a speaker 318, a printer 320, a data access application 322, and user perturbation rules 324. Fewer, different, and additional components may be incorporated into data access device 300.

Second input interface 302 provides an interface for receiving information from the user for entry into data access device 300 as understood by those skilled in the art. Second input interface 302 may interface with various input technologies including, but not limited to, keyboard 312, mouse 314, display 316, a track ball, a keypad, one or more buttons, etc. to allow the user to enter information into data access device 300 or to make selections presented in a user interface displayed on display 316. The same interface may support both second input interface 302 and second output interface 304. Data access device 300 may have one or more input interfaces that use the same or a different input interface technology. Keyboard 312, mouse 314, display 316, etc. further may be accessible by data access device 300 through second communication interface 306.

Second output interface 304 provides an interface for outputting information for review by a user of data access device 300. For example, second output interface 304 may interface with various output technologies including, but not limited to, display 316, speaker 318, printer 320, etc. Display 316 may be a thin film transistor display, a light emitting diode display, a liquid crystal display, or any of a variety of different displays understood by those skilled in the art. Speaker 318 may be any of a variety of speakers as understood by those skilled in the art. Printer 320 may be any of a variety of printers as understood by those skilled in the art. Data access device 300 may have one or more output interfaces that use the same or a different interface technology. Display 316, speaker 318, printer 320, etc. further may be accessible by data access device 300 through second communication interface 306.

Second communication interface 306 provides an interface for receiving and transmitting data between devices using various protocols, transmission technologies, and media as understood by those skilled in the art. Second communication interface 306 may support communication using various transmission media that may be wired and/or wireless. Data access device 300 may have one or more communication interfaces that use the same or a different communication interface technology. Data and messages may be transferred between data access device 300 and the grid systems 102 and/or grid control device 106 using communication interface 206.

Second computer-readable medium 308 is an electronic holding place or storage for information so the information can be accessed by second processor 310 as understood by those skilled in the art. Second computer-readable medium 308 can include, but is not limited to, any type of RAM, any type of ROM, any type of flash memory, etc. such as magnetic storage devices (e.g., hard disk, floppy disk, magnetic strips, . . . ), optical disks (e.g., CD, DVD, . . . ), smart cards, flash memory devices, cache memory such as level 1 and/or level 2 cache memory, etc. Data access device 300 may have one or more computer-readable media that use the same or a different memory media technology. Data access device 300 also may have one or more drives that support the loading of a memory media such as a CD or DVD.

Second processor 310 executes instructions as understood by those skilled in the art. The instructions may be carried out by a special purpose computer, logic circuits, or hardware circuits. Second processor 310 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Second processor 310 executes an instruction, meaning it performs/controls the operations called for by that instruction. Second processor 310 operably couples with second input interface 302, with second output interface 304, with second communication interface 306, and with second computer-readable medium 308 to receive, to send, and to process information. Second processor 310 may retrieve a set of instructions from a permanent memory device and copy the instructions in an executable form to a temporary memory device that is generally some form of RAM. Data access device 300 may include a plurality of processors that use the same or a different processing technology.

Data access application 322 performs operations associated with accessing/querying data stored in the cube of data distributed across the grid systems 102 and grid control device 106. Some or all of the operations described herein may be embodied in data access application 322. The operations may be implemented using hardware, firmware, software, or any combination of these methods. Referring to the example embodiment of FIG. 3, data access application 322 is implemented in software (comprised of computer-readable and/or computer-executable instructions) stored in second computer-readable medium 308 and accessible by second processor 310 for execution of the instructions that embody the operations of data access application 322. Data access application 322 may be written using one or more programming languages, assembly languages, scripting languages, etc.

Data access application 322 may be implemented as a Web application. For example, data access application 322 may be configured to receive HTTP responses from other computing devices such as those associated with grid control device 106 and/or grid systems 102 and to send HTTP requests. The HTTP responses may include web pages such as HTML documents and linked objects generated in response to the HTTP requests. Each web page may be identified by a URL that includes the location or address of the computing device that contains the resource to be accessed in addition to the location of the resource on that computing device. The type of file or resource depends on the Internet application protocol.

The file accessed may be a simple text file, an image file, an audio file, a video file, an executable, a common gateway interface application, a Java applet, an XML file, or any other type of file supported by HTTP.

Data access application 322 may provide a user interface that supports definition of user perturbation rules 324. User perturbation rules 324 perform operations applied to data read from the cube of data before the data is returned as part of a query of the cube of data. The operations may be implemented using hardware, firmware, software, or any combination of these methods. Referring to the example embodiment of FIG. 3, user perturbation rules 324 are implemented in software (comprised of computer-readable and/or computer-executable instructions) stored in second computer-readable medium 308. User perturbation rules 324 may be written using one or more programming languages, assembly languages, scripting languages, etc. User perturbation rules 324 may be created and stored to second computer-readable medium 308 and/or may be stored to another computer-readable medium accessible using second communication interface 306. User perturbation rules 324 may be stored in association with a user, for example, using a username. User perturbation rules 324 further may be stored in association with a cube of data, for example, using a cube name.

As understood by a person of skill in the art, user perturbation rules 324 may be defined in a variety of manners. For illustration, software products such as SAS/STAT, SAS/Risk Dimensions, SAS/ETS, SAS/IML, SAS/QC, and SAS/OR developed and marketed by SAS Institute Inc. may be used to perform statistical and analytical tasks on a cube of data and may provide a user interface for a user to define user perturbation rules 324. For example, the provided user interface may include a text window in which the user enters computer-readable and/or computer-executable instructions in a selected programming language. For example, the user may enter the following computer-readable and/or computer-executable instructions:

```
if insttype = 'BOND' and issuer = 'GREECE' then
    Zerocurve_name = 'HighRate';
else
    Zerocurve_name = 'LowRate';
```

As another example, the provided user interface may include a text window in which the user enters values that are used to create computer-readable and/or computer-executable instructions in a selected programming language. For example, the following table includes sample values used to create computer-readable and/or computer-executable instructions:

| Name | Value | Perturb Type | Rule Type | Rule Value |
|------|-------|--------------|-----------|------------|
| InstVar1 | 400 | Absolute | Filter | InstId = 'I2' |
| InstVar2 | 0.2 | Relative | Filter | InstId = IN('I3', 'I4') |
| RateCurve | curve1 | Value | InstId | I4 |
| RateCurve | curve2 | Value | CptyId | Cpty7 |

Each row of the table may be converted to computer-readable instructions. For example, the parameters defined in the table above may be used to create the following computer-readable instructions:

1. if InstId='I2' then InstVar1=InstVar1+400;
2. if InstId=IN('I3','I4') then InstVar2=InstVar2*1.2;
3. if InstId='I4' then RateCurve='curve1';
4. if CptyID='Cpty7' then RateCurve='curve2';

As a row in the cube of data is read, each rule is applied to possibly adjust the data read, for example, by adding a constant value to the read value, by multiplying the read value by a constant value, by applying a different curve to the read value based on the value of another field, etc. The rule may vary based on the type of data stored in each field of each row.

Figure 4:
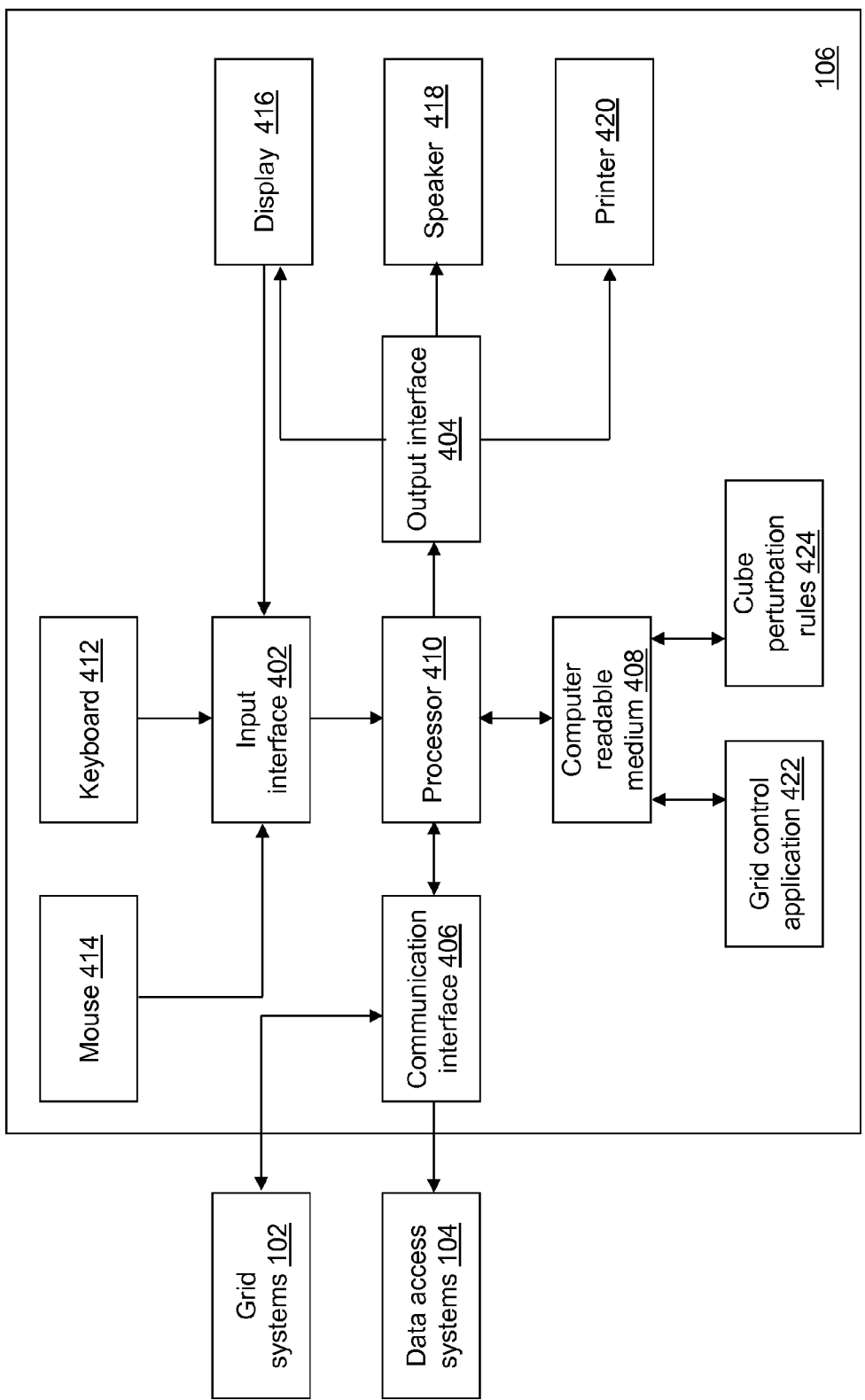
FIG. 4 depicts a block diagram of a grid control device of the query processing system of FIG. 1 in accordance with an illustrative embodiment.

Referring to FIG. 4, a block diagram of grid control device 106 is shown in accordance with an illustrative embodiment. Grid control device 106 may include a third input interface 402, a third output interface 404, a third communication interface 406, a third computer-readable medium 408, a third processor 410, a second keyboard 412, a second mouse 414, a second display 416, a second speaker 418, a second printer 420, a grid control application 422, and cube perturbation rules 424. Fewer, different, and additional components may be incorporated into grid control device 106.

Third input interface 402 provides the same or similar functionality as that described with reference to input interface 202 of node device 200 though referring to grid control device 106. Third output interface 404 provides the same or similar functionality as that described with reference to output interface 204 of node device 200 though referring to grid control device 106. Third communication interface 406 provides the same or similar functionality as that described with reference to communication interface 206 of node device 200 though referring to grid control device 106. Data and messages may be transferred between grid control device 106 and the grid systems 102 and/or the data access systems 104 using third communication interface 406. Third computer-readable medium 408 provides the same or similar functionality as that described with reference to computer-readable medium 208 of node device 200 though referring to grid control device 106. Third processor 422 provides the same or similar functionality as that described with reference to processor 210 of node device 200 though referring to grid control device 106.

Second keyboard 412 provides the same or similar functionality as that described with reference to keyboard 312 of data access device 300 though referring to grid control device 106. Second mouse 414 provides the same or similar functionality as that described with reference to mouse 314 of data access device 300 though referring to grid control device 106. Second display 416 provides the same or similar functionality as that described with reference to display 316 of data access device 300 though referring to grid control device 106. Second speaker 418 provides the same or similar functionality as that described with reference to speaker 318 of data access device 300 though referring to grid control device 106. Second printer 420 provides the same or similar functionality as that described with reference to printer 320 of data access device 300 though referring to grid control device 106.

Grid control application 422 performs operations associated with controlling access to the cube of data distributed to the grid systems 102. Some or all of the operations described herein may be embodied in grid control application 422. The operations may be implemented using hardware, firmware, software, or any combination of these methods. Referring to the example embodiment of FIG. 4, grid control application 422 is implemented in software (comprised of computer-readable and/or computer-executable instructions) stored in third computer-readable medium 408 and accessible by third processor 422 for execution of the instructions that embody the operations of grid control application 422. Grid control application 422 may be written using one or more programming languages, assembly languages, scripting languages, etc.

Grid control application 422 may be implemented as a Web application. For example, grid control application 422 may be configured to accept HTTP requests from client devices such as those associated with data access systems 104 and grid systems 102 and to send HTTP responses with optional additional data content which may include web pages such as HTML documents and linked objects in response to the HTTP requests.

Similar to user perturbation rules 324, cube perturbation rules 424 perform operations applied to data read from the cube of data before the data is returned as part of a query of the cube of data. The operations may be implemented using hardware, firmware, software, or any combination of these methods. Referring to the example embodiment of FIG. 4, cube perturbation rules 424 are implemented in software (comprised of computer-readable and/or computer-executable instructions) stored in third computer-readable medium 408. Cube perturbation rules 424 may be written using one or more programming languages, assembly languages, scripting languages, etc. Cube perturbation rules 424 may be created and stored to third computer-readable medium 408 and/or may be stored to another computer-readable medium accessible using third communication interface 406. For example, cube perturbation rules 424 may be created at data access device 300 and stored in second computer-readable medium 308. Cube perturbation rules 424 may be stored in association with a cube of data, for example, using a cube name. Cube perturbation rules 424 may be applied to all queries to the cube of data to which the cube perturbation rules 424 are associated as various users access the cube of data.

Various levels of integration between the components of query processing system 100 may be implemented without limitation as understood by a person of skill in the art. For example, node control application 212 and grid control application 422 may be the same or different applications or part of an integrated, distributed application supporting some or all of the same or additional types of functionality as described herein.

Figure 5A:
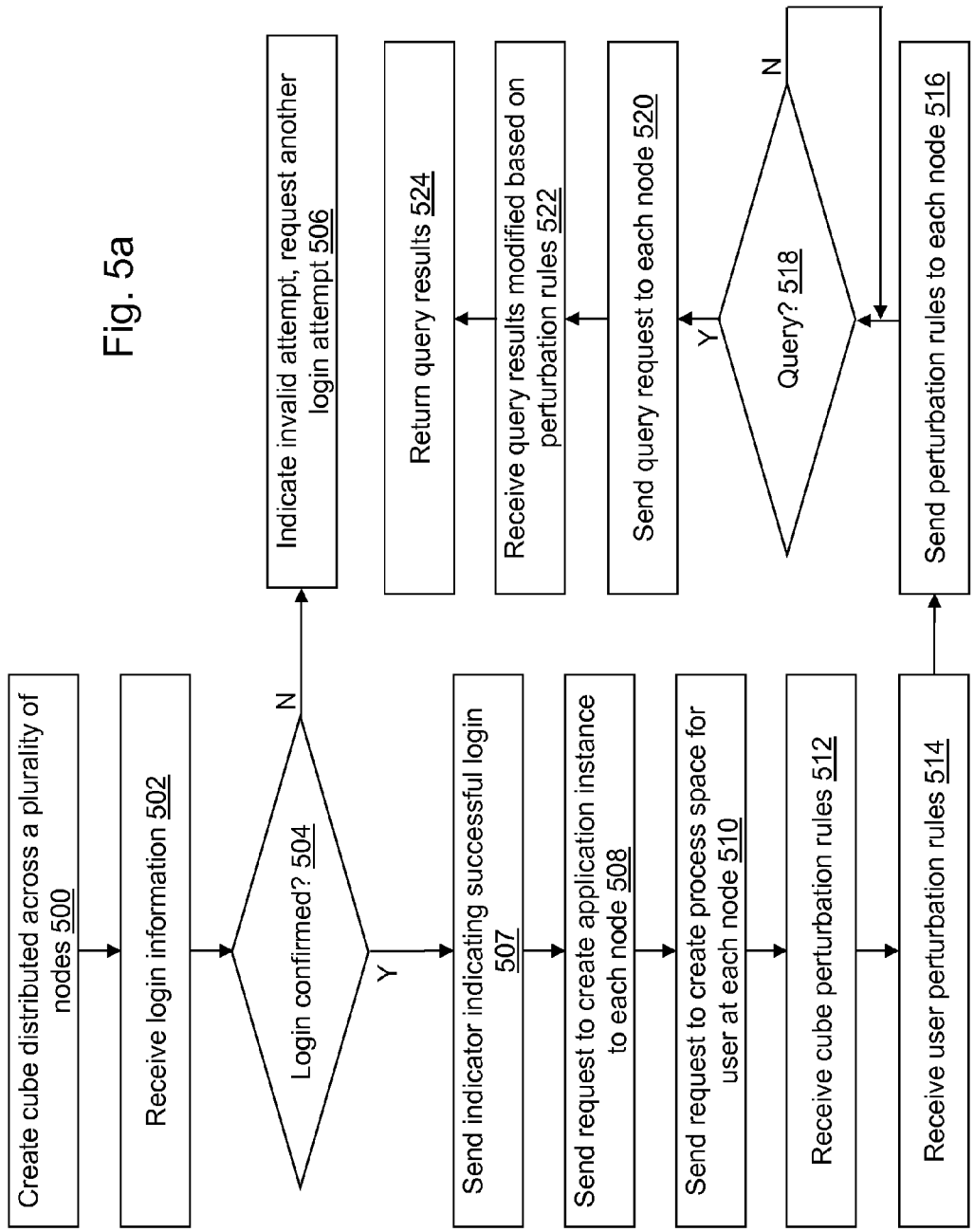
FIG. 5a depicts a flow diagram illustrating examples of operations performed by the grid control device of FIG. 4 in accordance with an illustrative embodiment.

Referring to FIG. 5a, example operations associated with grid control application 422 are described. Additional, fewer, or different operations may be performed depending on the embodiment. The order of presentation of the operations of FIG. 5a is not intended to be limiting. Although some of the operational flows are presented in sequence, the various operations may be performed in various repetitions, concurrently, and/or in other orders than those that are illustrated. For example, a user may execute grid control application 422, which causes presentation of a first user interface window that may include a plurality of menus and selectors such as drop down menus, buttons, text boxes, hyperlinks, etc. associated with grid control application 422 as understood by a person of skill in the art. As further understood by a person of skill in the art, various operations may be performed in parallel, for example, using threads.

In an operation 500, a cube of data is created by distributing the data into data subcubes stored at a plurality of computing devices (grid nodes) of the grid systems 102. For illustration, one or more rows of the cube of data are stored to each of the grid systems 102. For example, data subcube 214 is created and stored at node device 200 and includes N rows of data of the entire cube of data.

A cube of data is a multidimensional dataset that can have any number of dimensions. As an example, each cell of the cube holds a value that represents some measure of a business, such as sales, profits, expenses, budget, forecast, etc. possibly as a function of product, location, etc. The data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

In an operation 502, login information is received for a user requesting access to the created cube of data using data access application 322 as understood by a person of skill in the art. For example, a user may execute data access application 322, which causes presentation of a login user interface window that may include a username textbox and a password textbox. Using the login user interface window, the user can select the cube of data and login to access the selected cube of data, for example, by entering a username in the username textbox and a password in the password textbox. After logging in to data access application 322, data access application 322 may control the presentation of additional user interface windows that may include a plurality of menus and selectors such as drop down menus, buttons, text boxes, hyperlinks, additional windows, etc. associated with data access application 322 and also may coordinate interactions with grid control application 422.

In an operation 504, grid control application 422 confirms whether or not the login is successful by the user. If the login is unsuccessful, processing continues in an operation 506. In operation 506, an indicator is sent to data access application 322 indicating that an invalid login attempt has occurred and requesting another login attempt. If the login is successful, processing continues in an operation 507. In operation 507, a notification is sent to the user indicating a successful login to access the cube of data.

In operation 508, a request to create an instance of node control application 212 is sent to each grid node of the cube of data to which the user is requesting access. For example, the request is sent to node device 200.

In an operation 510, a request to create a process space for the user is sent to each grid node of the cube of data to which the user is requesting access. For example, the request is sent to node device 200.

In an operation 512, cube perturbation rules are received. Cube perturbation rules 424 may be created by the same or a different user using mouse 314, keyboard 312, display 316, etc. and may be stored in second computer-readable medium 308 (or on another computing device accessible by data access device 300 using second communication interface 306) and received by grid control device 106 using third communication interface 406. Cube perturbation rules 424 may have been created previously using any device of query processing system 100 and may be stored in third computer-readable medium 408, or on another computing device accessible by grid control device 106 using third communication interface 406. Cube perturbation rules 424 may be received by opening a file that contains cube perturbation rules 424 and retrieving the information from the appropriate memory location.

In an operation 514, user perturbation rules 324 are received. User perturbation rules 324 may be created by the same or a different user using mouse 314, keyboard 312, display 316, etc. and may be stored in second computer-readable medium 308 (or on another computing device accessible by data access device 300 using second communication interface 306) and received by grid control device 106 using third communication interface 406. User perturbation rules 324 may have been created previously using any device of query processing system 100 and may be stored in third computer-readable medium 408, or on another computing device accessible by grid control device 106 using third communication interface 406. User perturbation rules 324 may be received by opening a file that contains user perturbation rules 324 and retrieving the information from the appropriate memory location.

In an operation 516, user perturbation rules 324 and cube perturbation rules 424 are sent to each grid node of the cube of data to which the user is requesting access. For example, the perturbation rules 324, 424 are sent to node device 200. In another embodiment, cube perturbation rules 424 may be sent separately to each grid node of the cube of data to which the user is requesting access and stored in computer-readable medium 208.

Operations 508, 510, and 516 may include the sending of one or more messages to each grid node of the cube of data to which the user is requesting access. For example, a single message associated with each user may be sent to each grid node of grid systems 102.

In an operation 518, a determination is made concerning whether a query is received from the user. If a query is not received, processing continues in operation 518 awaiting receipt of a query of the cube of data. If a query is received, processing continues in operation 520. In operation 520, a request based on the query is sent to each grid node of grid systems 102 storing the cube of data to which the user is requesting access.

In an operation 522, the query results are received from each grid node of grid systems 102 storing the cube of data to which the user is requesting access. In an operation 524, the query results may be combined and returned to data access device 300. In another embodiment, the results of the query may be directly sent to data access device 300 from each grid node.

Of course, any number of different users may be accessing the cube of data at any given time. Thus, grid control application 424 is continuously performing operations 500 to 524 at various points in various repetitions as various users access the cube of data. Grid control application 424 further may perform operations 500 to 524 to coordinate and control access to multiple different cubes of data.

Figure 5B:
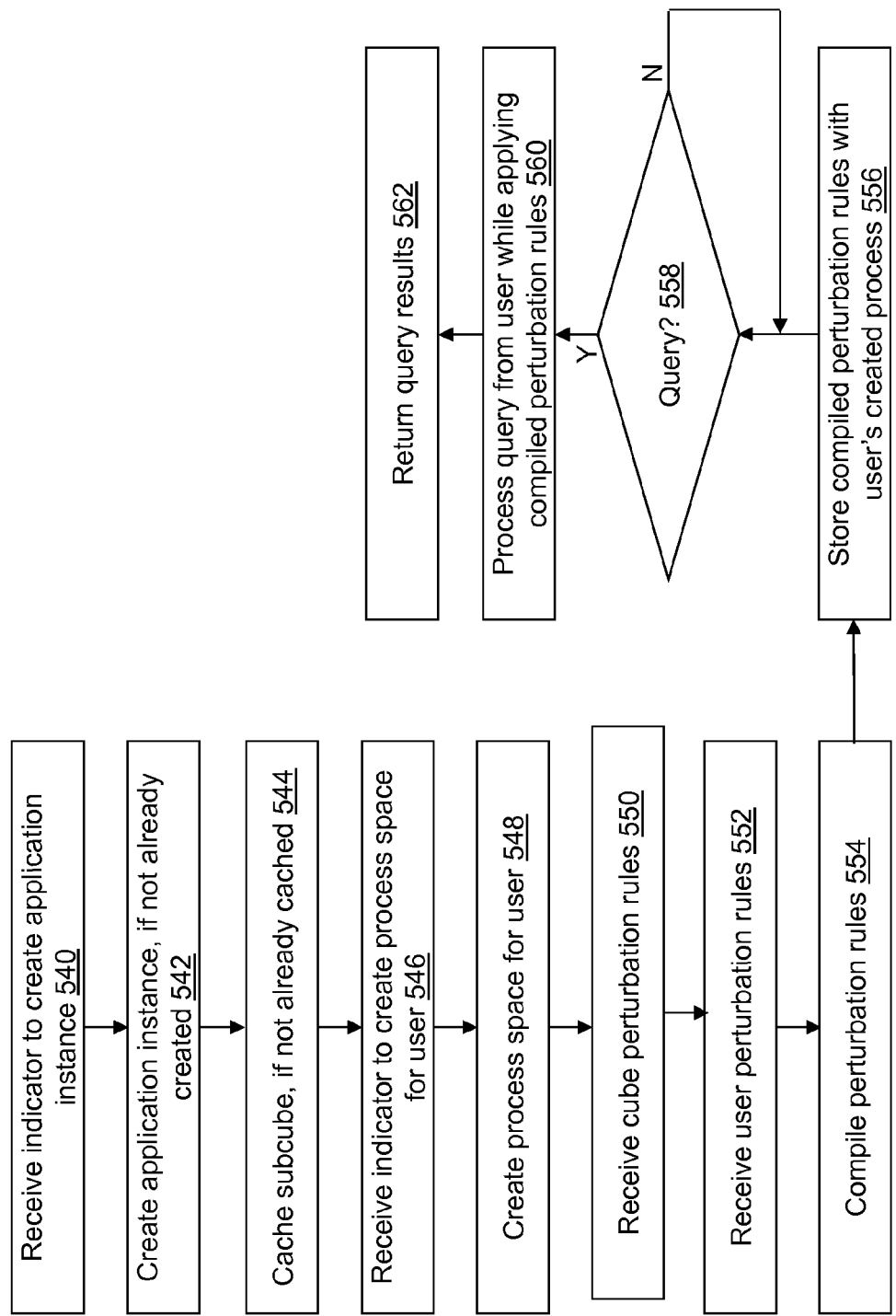
FIG. 5b depicts a flow diagram illustrating examples of operations performed by the node device of FIG. 2 in accordance with an illustrative embodiment.

Referring to FIG. 5b, example operations associated with node control application 212 are described. Additional, fewer, or different operations may be performed depending on the embodiment. The order of presentation of the operations of FIG. 5b is not intended to be limiting. Although some of the operational flows are presented in sequence, the various operations may be performed in various repetitions, concurrently (in parallel), and/or in other orders than those that are illustrated. For example, a user may execute data access application 322 which interacts with grid control application 422. Grid control application 422 triggers processing by node control application 212 executing at each grid node of the grid systems 102.

Figure 6:
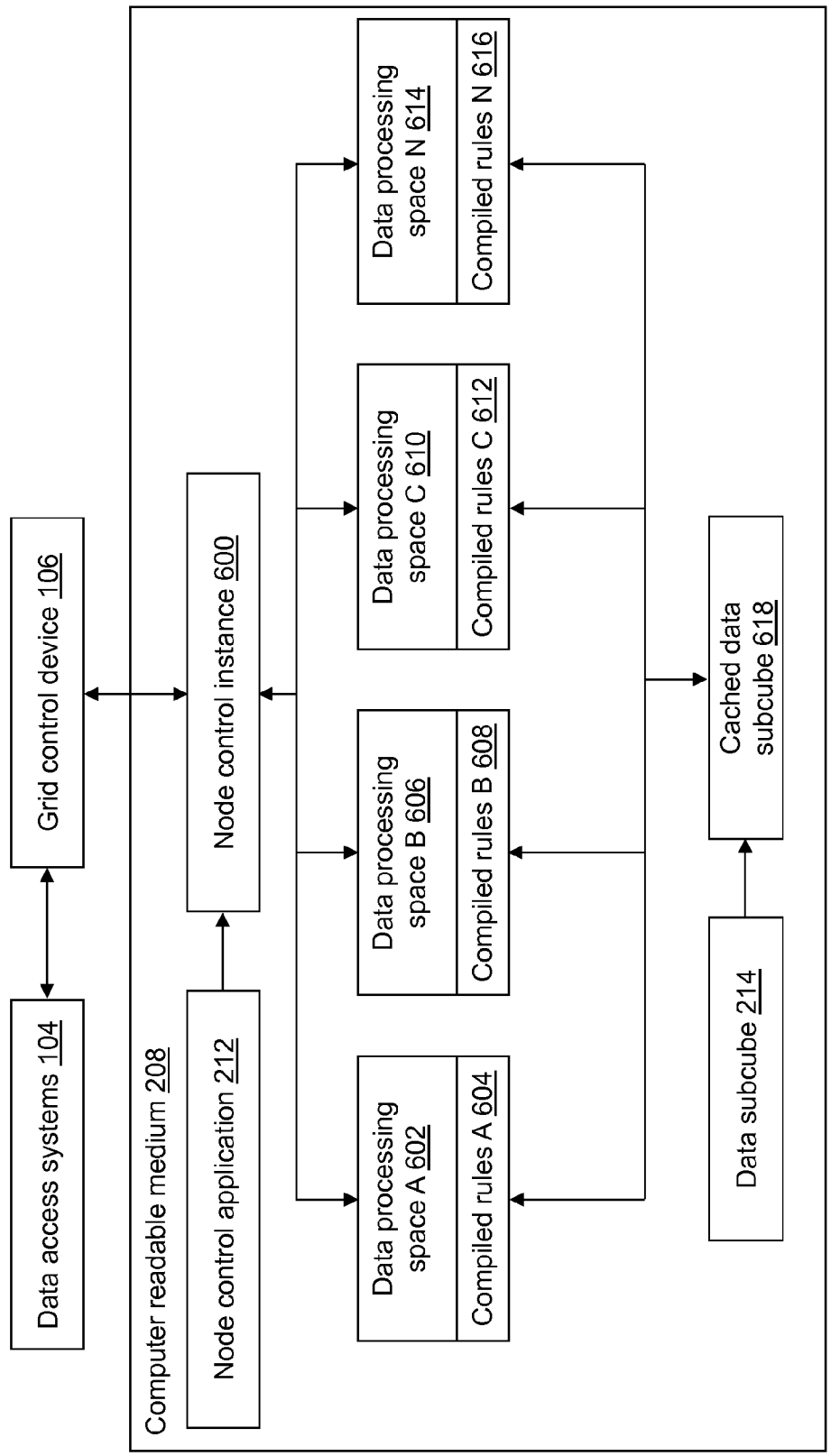
FIG. 6 depicts a block diagram of components stored in a computer-readable medium of the node device of FIG. 2 in accordance with an illustrative embodiment.

In an operation 540, an indicator is received, for example from grid control device 106, requesting creation of an instance of node control application 212 at node device 200. In an operation 542, an instance of node control application 212 is created at node device 200 if an instance is not already executing at node device 200. For example, referring to FIG. 6, a node control instance 600 is created by processor 210 and stored in computer readable medium 208 of node device 200. In the illustrative embodiment, node control instance 600 is in communication with grid control application 422 executing at grid control device 106. In other embodiments, node control instance 600 may be in direct communication with data access application 322 executing at data access device 300.

Referring to FIG. 5b, in an operation 544, if data subcube 214 is not already stored in a cache type memory, data subcube 214 is moved to the cache type memory of computer readable medium 208 of node device 200 so that the data can be accessed quickly. For example, referring to FIG. 6, a cached data subcube 618 is created by processor 210 and stored in the cache type memory, such as a level 1 cache, of computer readable medium 208 of node device 200.

Referring to FIG. 5b, in an operation 546, an indicator is received, for example from grid control device 106, requesting creation of a process space for the user at node device 200. Memory mapping technology may be used so that a process space is created for each user accessing the cube of data at each grid node of the grid systems 102. For illustration, shared memory makes a segment of memory accessible to more than one process. Shared memory is not drawn from each process's own memory, which remains private. Instead, shared memory is allocated from a free memory pool of computer readable medium 208 of node device 200 and is annexed by each process that requests access. Annexation may be called mapping, where the shared segment of memory is assigned local addresses in each process' own address space.

In an operation 548, the process space is created for the user. For example, referring to FIG. 6, a data processing space A 602 is created for a first user, a data processing space B 606 is created for a second user, a data processing space C 610 is created for a third user, . . . , a data processing space N 614 is created for an Nth user as understood by a person of skill in the art.

Referring to FIG. 5b, in an operation 550, cube perturbation rules 424 are received, for example from grid control device 106. In an operation 552, user perturbation rules 324 are received for the user, for example from grid control device 106. Of course, cube perturbation rules 424 and user perturbation rules 324 may be received as part of the same message sent from grid control device 106. In another embodiment, cube perturbation rules 424 may be received separate from user perturbation rules 324. For example, cube perturbation rules 424 may be received prior to receipt of user perturbation rules 324, such as prior to performance of operation 540. In another embodiment, there are no cube perturbation rules 424.

In an operation 554, cube perturbation rules 424 and user perturbation rules 324 are compiled. In an operation 556, the compiled cube perturbation rules 424 and user perturbation rules 324 are stored in association with the process space created for the user. For example, referring to FIG. 6, compiled rules A 604 are created and stored in association with data processing space A 602 for the first user, compiled rules B 608 are created and stored in association with data processing space B 606 for the second user, compiled rules C 612 are created and stored in association with data processing space C 610 for the third user, . . . , compiled rules N 616 are created and stored in association with data processing space N 614 for the Nth user.

Referring to FIG. 5b, in an operation 558, a determination is made concerning whether a query of data subcube 214 is received in association with the user. If a query is not received, processing continues in operation 558 awaiting receipt of a query of the cube of data. If a query is received, processing continues in operation 560.

In operation 560, the query is processed in the process space created for the user while applying the compiled perturbation rules associated with the user. For example, if a query of the cube of data is received at node device 200 for the first user, a query of cached data subcube 618 is performed in data processing space A 602 by applying compiled rules A 604 to each row of data read from cached data subcube 618. Compiled rules A 604 may be complex and the row of data large. Node device 200 compiles the rules on the fly into machine language so that the cube is modified quickly.

In an operation 562, the results of the query may be returned by sending the results to grid control device 106 and/or data access device 300. The same query may return completely different results based on the compiled perturbation rules applied for each query based on the user even though there is a single copy of cached subcube 618 at node device 200.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a computing device cause the computing device to:
   receive a perturbation rule associated with a user, wherein the perturbation rule is configured for application to a cube of data, wherein the cube of data is distributed onto a plurality of computing devices with each computing device of the plurality of computing devices storing a different portion of the cube of data, wherein the computing device is one of the plurality of computing devices;
   create a process space associated with the user;
   compile the received perturbation rule in association with the created process space;
   receive a query on the portion of the cube of data stored at the computing device, wherein the query is associated with the user;
   associate the received query with the created process space;
   process the query while applying the compiled perturbation rule to data extracted from the portion of the cube of data stored at the computing device; and
   send a result of the processed query to a requesting computing device.

2. The computer-readable medium of claim 1, wherein the compiled perturbation rule is stored in a cache type computer-readable medium.

3. The computer-readable medium of claim 1, wherein the perturbation rule includes second computer-readable instructions configured to modify data stored in the cube of data.

4. The computer-readable medium of claim 3, wherein the perturbation rule is configured to modify a row of data stored in the cube of data.

5. The computer-readable medium of claim 1, wherein the perturbation rule includes first computer-readable instructions configured to modify data stored in the cube of data for only the user accessing the cube of data.

6. The computer-readable medium of claim 5, wherein the perturbation rule includes second computer-readable instructions configured to modify data stored in the cube of data for all users accessing the cube of data.

7. The computer-readable medium of claim 1, wherein the compiled perturbation rule is configured to modify data stored in the portion of the cube of data as the query is processed in the created process space.

8. The computer-readable medium of claim 1, wherein the computer-readable instructions further cause the computing device to:
   receive a second perturbation rule associated with a second user, wherein the second perturbation rule is different than the perturbation rule;
   create a second process space associated with the second user, wherein the second process space is different than the process space;
   compile the received second perturbation rule in association with the created second process space;
   receive a second query on the cube of data, wherein the second query is associated with the second user;
   associate the received second query with the created second process space;
   process the second query while applying the compiled second perturbation rule to the data extracted from the portion of the cube of data stored at the computing device; and
   send a second result of the processed second query to a second requesting computing device.

9. The computer-readable medium of claim 8, wherein the query and the second query are processed using the same copy of the portion of the cube of data.

10. A system comprising:
    a processor; and
    a computer-readable medium operably coupled to the processor, the computer-readable medium having computer-readable instructions stored thereon that, when executed by the processor, cause the system to
    receive a perturbation rule associated with a user, wherein the perturbation rule is configured for application to a cube of data, wherein the cube of data is distributed onto a plurality of computing devices with each computing device of the plurality of computing devices storing a different portion of the cube of data, wherein the computing device is one of the plurality of computing devices;
    create a process space associated with the user;
    compile the received perturbation rule in association with the created process space;
    receive a query on the portion of the cube of data stored at the computing device, wherein the query is associated with the user;
    associate the received query with the created process space;

process the query while applying the compiled perturbation rule to data extracted from the portion of the cube of data stored at the computing device; and send a result of the processed query to a requesting computing device.

11. The system of claim 10, wherein the perturbation rule includes second computer-readable instructions configured to modify data stored in the cube of data.

12. The system of claim 11, wherein the perturbation rule is configured to modify a row of data stored in the cube of data.

13. The system of claim 10, wherein the perturbation rule includes first computer-readable instructions configured to modify data stored in the cube of data for only the user accessing the cube of data.

14. The system of claim 13, wherein the perturbation rule includes second computer-readable instructions configured to modify data stored in the cube of data for all users accessing the cube of data.

15. The system of claim 10, wherein the compiled perturbation rule is configured to modify data stored in the portion of the cube of data as the query is processed in the created process space.

16. The system of claim 10, wherein the computer-readable instructions further cause the system to:

receive a second perturbation rule associated with a second user, wherein the second perturbation rule is different than the perturbation rule;

create a second process space associated with the second user, wherein the second process space is different than the process space;

compile the received second perturbation rule in association with the created second process space;

receive a second query on the cube of data, wherein the second query is associated with the second user;

associate the received second query with the created second process space;

process the second query while applying the compiled second perturbation rule to the data extracted from the portion of the cube of data stored at the computing device; and send a second result of the processed second query to a second requesting computing device.

17. The system of claim 16, wherein the query and the second query are processed using the same copy of the portion of the cube of data.

18. A method of performing a query on a cube of data, the method comprising:

receiving a perturbation rule associated with a user at a computing device, wherein the perturbation rule is configured for application to a cube of data, wherein the cube of data is distributed onto a plurality of computing devices with each computing device of the plurality of computing devices storing a different portion of the cube of data, wherein the computing device is one of the plurality of computing devices;

creating, by the computing device, a process space associated with the user;

compiling, by the computing device, the received perturbation rule in association with the created process space;

receiving a query on the portion of the cube of data stored at the computing device, wherein the query is associated with the user;

associating, by the computing device, the received query with the created process space;

processing the query, by the computing device, while applying the compiled perturbation rule to data extracted from the portion of the cube of data stored at the computing device; and sending, by the computing device, a result of the processed query to a requesting computing device.

19. The method of claim 18, wherein the perturbation rule includes second computer-readable instructions configured to modify data stored in the cube of data.

20. The method of claim 18, wherein the perturbation rule includes first computer-readable instructions configured to modify data stored in the cube of data for only the user accessing the cube of data.

21. The method of claim 20, wherein the perturbation rule includes second computer-readable instructions configured to modify data stored in the cube of data for all users accessing the cube of data.

22. The method of claim 18, wherein the compiled perturbation rule is configured to modify data stored in the portion of the cube of data as the query is processed in the created process space.

23. The method of claim 18, further comprising:

receiving a second perturbation rule associated with a second user, wherein the second perturbation rule is different than the perturbation rule;

creating, by the computing device, a second process space associated with the second user, wherein the second process space is different than the process space;

compiling, by the computing device, the received second perturbation rule in association with the created second process space;

receiving a second query on the cube of data at the computing device, wherein the second query is associated with the second user;

associating, by the computing device, the received second query with the created second process space;

processing the second query, by the computing device, while applying the compiled second perturbation rule to the data extracted from the portion of the cube of data stored at the computing device; and sending, by the computing device, a second result of the processed second query to a second requesting computing device.

24. The method of claim 23, wherein the query and the second query are processed using the same copy of the portion of the cube of data.

* * * * *